US007978207B1

(12) United States Patent
Herf et al.

(10) Patent No.: US 7,978,207 B1
(45) Date of Patent: Jul. 12, 2011

(54) GEOGRAPHIC IMAGE OVERLAY

(75) Inventors: Michael B. Herf, Los Angeles, CA (US); Ari Berger, Berkeley, CA (US); Brian A. McClendon, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 893 days.

(21) Appl. No.: 11/762,670

(22) Filed: Jun. 13, 2007

Related U.S. Application Data (60) Provisional application No. 60/813,390, filed on Jun. 13, 2006.

(51) Int. Cl.
*G09G 5/00* (2006.01)
(52) U.S. Cl. ......... 345/619; 345/428; 345/581; 345/689
(58) Field of Classification Search ........................ None
See application file for complete search history.

(56) References Cited

U.S. PATENT DOCUMENTS

| 6,883,146 | B2 * | 4/2005 | Prabhu et al. ................. | 715/854 |
| 2007/0258642 | A1 * | 11/2007 | Thota ............................. | 382/173 |

OTHER PUBLICATIONS

Author: Flickrmap, Title: Geotagging Flickr photos with Google Earth, Date: Apr. 4, 2006, pp. 2 source: http://web.archive.org/web/20060404213639/www.flickrmap.com/tutorials/google_earth.php.*
Author: Michael Arrington, Title: Flickr Geo Tagging Now Live, Date: Aug. 28, 2006, pp. 1, source: http://www.techcrunch.com/2006/08/28/flickr-to-launch-geo-tagging-today/.*
Author: Rakaz, Title: Geotagging with Picasa and Google Earth, Date: Aug. 23, 2006, pp. 6, source: http://rakaz.nl/2006/08/geotagging-with-picasa-and-google-earth.html.*
Author: Sue Chastain, Title: What's New in Photoshop Elements 5—Map View, Date: Feb. 13, 2007, pp. 2, source: http://web.archive.org/web/20070213213516/http://graphicssoft.about.com/od/pselements/ig/PSE5new/Map-View.htm.*
Author: Stewart Butterfiel, Title: Great shot—where'd you take that?, Date: Aug. 28, 2006, pp. 4, source: http://blog.flickr.net/en/2006/08/28/great-shot-whered-you-take-that/.*
Author: Joe Hughes, Title: The Incrementalist, Date: Jun. 17, 2006, pp. 10, source: http://retrovirus.com/incr/2006/06/picasa-geotagging/.*
Author: Stefan Geens, Title: Picasa+Google Earth=bliss, Date: Jun. 15, 2006, pp. 5 source: http://www.ogleearth.com/2006/06/picasa_google_e.html.*
Author: Frank Taylor, Title: Picasa Web Album—Geotag Photos Using Google Earth!, Date: Jun. 14, 2006, pp. 5 source: http://www.gearthblog.com/blog/archives/2006/06/picasa_web_albu.html.*
Author: Flickr, Title: Geotags & You, Date: Dec. 21, 2006, pp. 21, source: http://web.archive.org/web/20061221185831/http://www.flickr.com/help/screencasts/vol1.*
Author: RoboGeo, Title: Geocode Digital Photos, Date: Jan. 13, 2007, pp. 36, http://web.archive.org/web/20051125023223/http://www.robogeo.com/home/.*

(Continued)

*Primary Examiner* — Kee M Tung
*Assistant Examiner* — Jwalant Amin
(74) *Attorney, Agent, or Firm* — Fish & Richardson P.C.

(57) ABSTRACT

A computer-implemented method for correlating an electronic object with a geo-location is discussed. The method includes selecting an object in a first application for determination of a geo-location for the selected object, graphically identifying, in a second application, a geo-location to be associated with the selected object, and updating one or more values stored with the selected object to include information relating to the geo-location.

20 Claims, 7 Drawing Sheets

OTHER PUBLICATIONS

Author: Philipp Lenssen, Title: Google Picasa Web Albums Live, Date: Jun. 14, 2006, pp. 5, source: http://blogoscoped.com/archive/2006-06-14-n55.html.*

Author: RoboGeo, Title: Geocode Digital Photos, Date: Jan. 13, 2006, pp. 36, http://web.archive.org/web/20051125023223/http://www.robogeo.com/home.*

* cited by examiner

GEOGRAPHIC IMAGE OVERLAY

CROSS REFERENCE TO RELATED APPLICATION

This application claims priority to U.S. Application Ser. No. 60/813,390, filed on Jun. 13, 2006, the contents of which are hereby incorporated by reference.

BACKGROUND

People enjoy sharing photos with each other. In earlier days, such sharing occurred by opening wallets or scrapbooks for friends, or by gathering around a slide projector in dark room. Today, such sharing may occur via e-mail, via broadcast to proprietary digital picture frames, or via photo sharing applications such as Google's Picasa.

Google also provides geographic-specific information via its well-known Google Earth application. This application permits users to navigate the world easily using a graphical representation, so as to find particular geographic areas and to see satellite photos, maps, and 3D structures placed at particular geographic locations.

SUMMARY

This document describes approaches for correlating photos and other similar objects with a geographic information system, such as Google Earth. The described features may permit a user to conveniently identify an object, such as by selecting a photo in an image application like Picasa, and selecting a geographic location to associate with the object, such as the location at which a photo was taken. The identification of a geographic location may occur, for example, by visually navigating to a location such as by using a graphical program having zoom and pan features, like Google Earth. The navigation may also occur by entering an address into an application like Google Earth—the visual representation may then zoom in on that location.

In addition, information associated with the object, such as a tag associated with a photo, may provide a geographic location for an object. That geographic location may cause an application to initially zoom in on that location—allowing a user to more readily identify the appropriate location for geo-correlating with the object. The location may also be used as the geo-correlation for the object. For example, if a photo has a tag of "Weekend in Chicago," an application may identify the geo-coordinates for the photo as the center of Chicago, Ill. Where contextual information about an object, such as tags, is indeterminate as to a location, other contextual information may be analyzed. For example, other objects in a common library may be reviewed to provide a more definite determination of geo-location. For example, if a photo is labeled "Weekend in Eldred," it might refer to Eldred, Minn. or Eldred, Ill. However, if another photo is labeled "The Climax Elevator," the system may infer that the first photo is to be geo-correlated with Eldred, Minn., which is only 7 to 8 miles from Climax, Minn.

Also, the other contextual information may be information about the user. For example, the user may have a profile with a system that identifies their home address, or the system may analyze IP address information about the user to determine the user's "home" location. This information may also be used to make determinations about geo-correlation more definite.

In one implementation, a computer-implemented method for correlating an electronic object with a geo-location is disclosed. The method includes selecting an object in a first application for determination of a geo-location for the selected object, graphically identifying, in a second application, a geo-location to be associated with the selected object, and updating one or more values stored with the selected object to include information relating to the geo-location. The selected object may comprise an image file, which may in turn comprise a JPEG file. Graphically identifying a geo-location can comprise graphically zooming and panning in a visual representation of the earth.

In some aspects, updating the one or more values stored with the object includes writing geo-location data to fields in an image file. Also, the one or more values may comprise longitude/latitude data, or may comprise longitude/latitude data and additionally comprise viewing information. In addition, updating the one or more values stored with the object to include information related to the geo-location may comprise passing latitude/longitude information from the second application to another application.

In another implementation, a computer-implemented method is disclosed that includes identifying a digital image, graphically navigating a geographic information system application to identify a location to associate with the digital image, and automatically modifying meta data associated with the digital image to include data for the identified location. The method may further comprise passing information about the identified digital image from an image application to a geo application. The geo application can include the geographic information system application in some implementations. Also, the geo application can include an application in communication with the geographic information system application. In some aspects, the method further comprises transmitting location data from the geographic information system application to a photo application storing the digital image.

In yet another implementation, a computer-implemented system is disclosed. The system includes an imaging application for accessing and organizing digital images, a geographic information application including controls for graphically identifying a geographic location, and means for communicating location information from the geographic information application to the imaging application for identifying locations associated with images accessed by the imaging application. The means for communicating location information may, in some aspects, comprise a web application that is launched by a control in the imaging application and that communicates with the geographic information application through an application programming interface.

In some aspects, the geographic information application provides latitude/longitude information in response to graphical navigation to a location on a map. Also, the geographic information application can provide latitude/longitude information in response to submission of an address-based query. For its part, the imaging application can transmit information about user-selected images using mark up language transmissions in certain implementations. Also, the means for communicating may access image files for the digital images in a native location for the digital image files. The means for communicating may also be configured to update image header information associated with the digital images to include location information.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

An image server may provide, through a local host webserver, for the serving of images to various applications, such as a web browser and applications running within a web browser. The image server may include servers such as those used with the Google Picasa application. In certain implementations, the images may be served to a geographic information system such as a Google Earth server or client using standard APIs. For example, Google Earth format KML or KMZ files may be written by the image server or a client accessing the image server, so as to cause images served by the image server to be referenced when the geographic information system executes the file or files. For example, a geographic mapping server may be provided with the ability to ask a web server information using a latitude/longitude query, so that when a location is fixed upon by a user in a geography, objects such as images associated with the location may be displayed. Such objects may also be accessed for multiple users, and icons such as animated pins may be shown on a map or a 3D representation of a geography to permit easier access to geo-correlated objects such as photos. One exemplary implementation for permitting the geo-correlation of objects such as digital photos is shown in the figures below.

Figure 1:
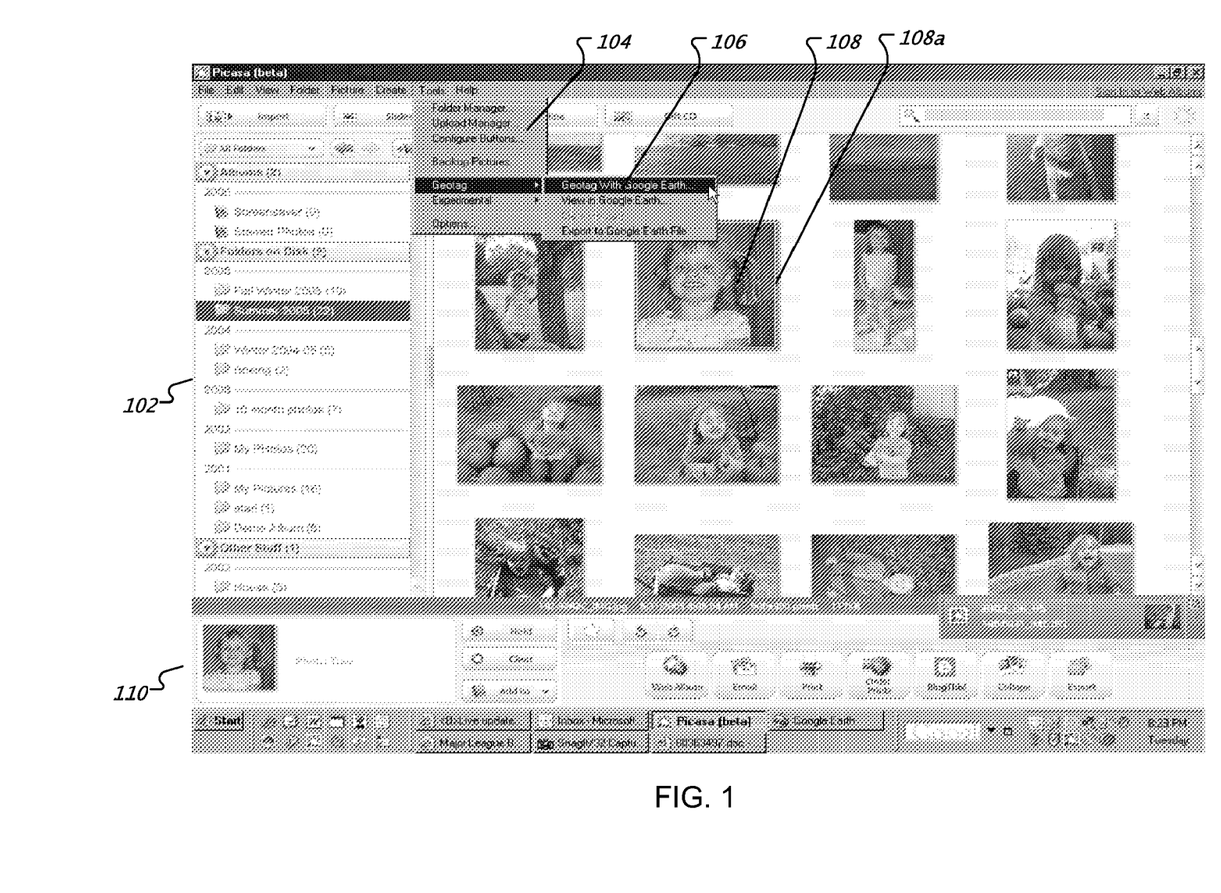
FIG. 1 is a screen shot of a photo management program with a geo-related pull down menu.

FIG. 1 is a screen shot of a photo management program with a geo-related pull down menu. In FIG. 1, the Picasa image application 102 is displayed, and is shown with a pull-down menu 104 and a pull-down sub-menu 106, extended to show several geo-correlation selections. Certain selections may be grayed out (and thus are not currently available) if no photo is presently selected. In the figure, a digital photo of a pig-tailed girl is selected, as indicated by a thick-lined box 108a around a thumbnail 108 representation of that photo. Thus, the choices for "Geotag with Google Earth," "View in Google Earth," and "Export to Google Earth File" are available for present selection, as indicated by those choices being displayed in black, rather than gray, text.

Other portions of the display 100 may provide additional functionality. For example, navigation pane 102 may show storage locations of files such as photos, stored on a local client or at a remote server. The files may be organized by storage folders, tags, ratings, or other known organizational techniques. A lower display area 110 may show information about the selected thumbnail 108, such as meta data relating to a photo (e.g., a lat/long pair associated with a geo-tagged photo). The lower display area 110 may also include a number of controls for interacting with objects such as photos. The controls may permit, for example, for the viewing or creation of a custom web photo album, for e-mailing or printing selected photos, for ordering mail-order prints of selected photos, for posting a blog entry about a photo, for building a collage out of multiple selected photos, and for exporting photos such as to other applications.

In the pull down menus 104, 106, the choice for "Clear Geotag" is not currently available (as indicated by gray or light text) because the selected image has not yet been geotagged. If the image had already been tagged, the "clear geotag" selection would remove geographic information from the image file or with a file associated with the image file, so as to restore it to a non-geo-correlated status.

Selection of the "Export to Google Earth File" choice may cause the creation of a file such as a KML file that identifies the selected object, and also identifies location-specific information for the file. In this manner, a geographic information system such as Google Earth can access such a file to display the object in an appropriate location when the application for the geographic information system is executed.

Selection of the "View in Google Earth" choice may cause the object to be shown in a geo-correlated location in an application for a geographic information system such as Google Earth—where the object has previously been geo-correlated.

Figure 2:
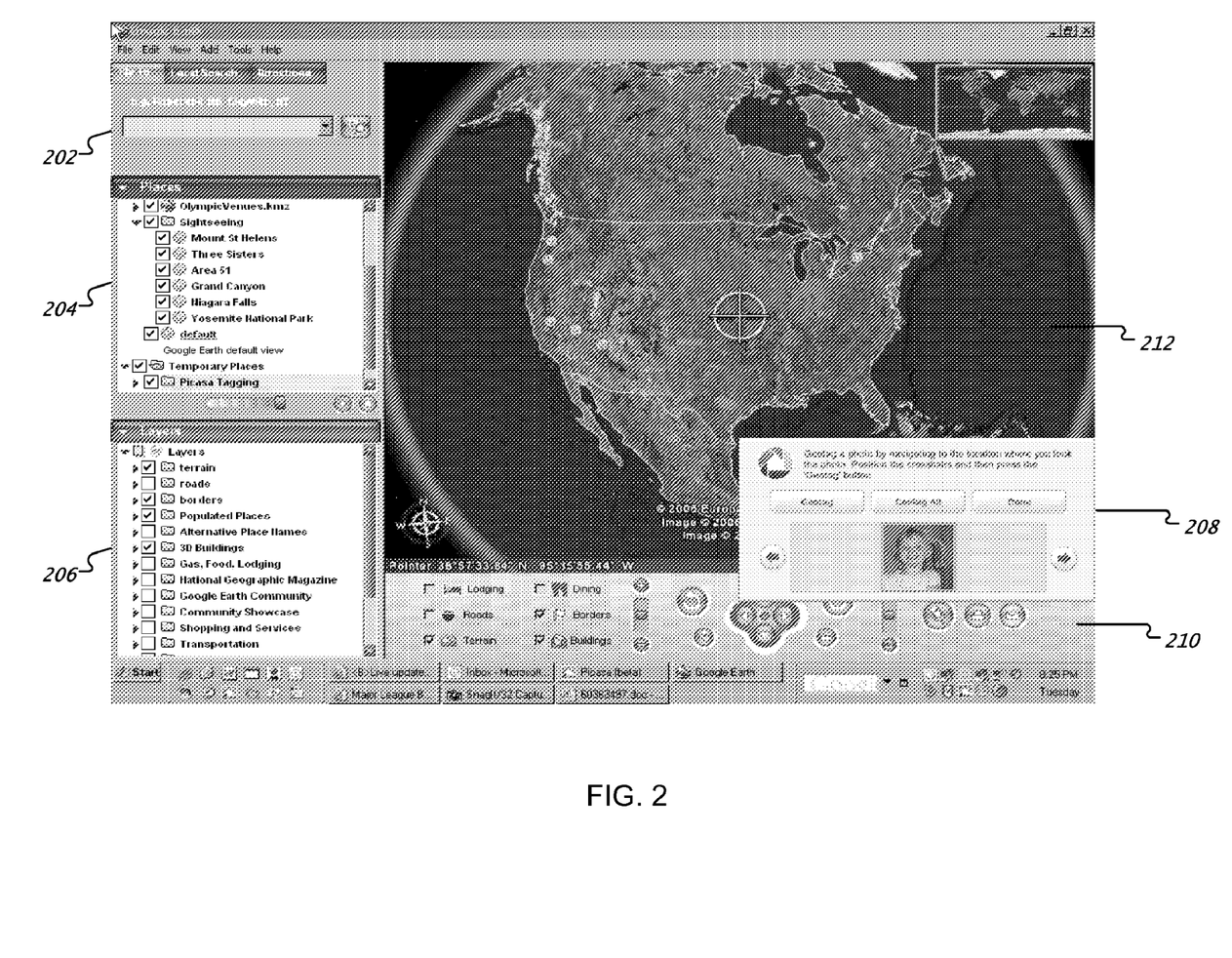
FIG. 2 is a screen shot of a geo-application interoperating with a photo tool.
Figure 3:
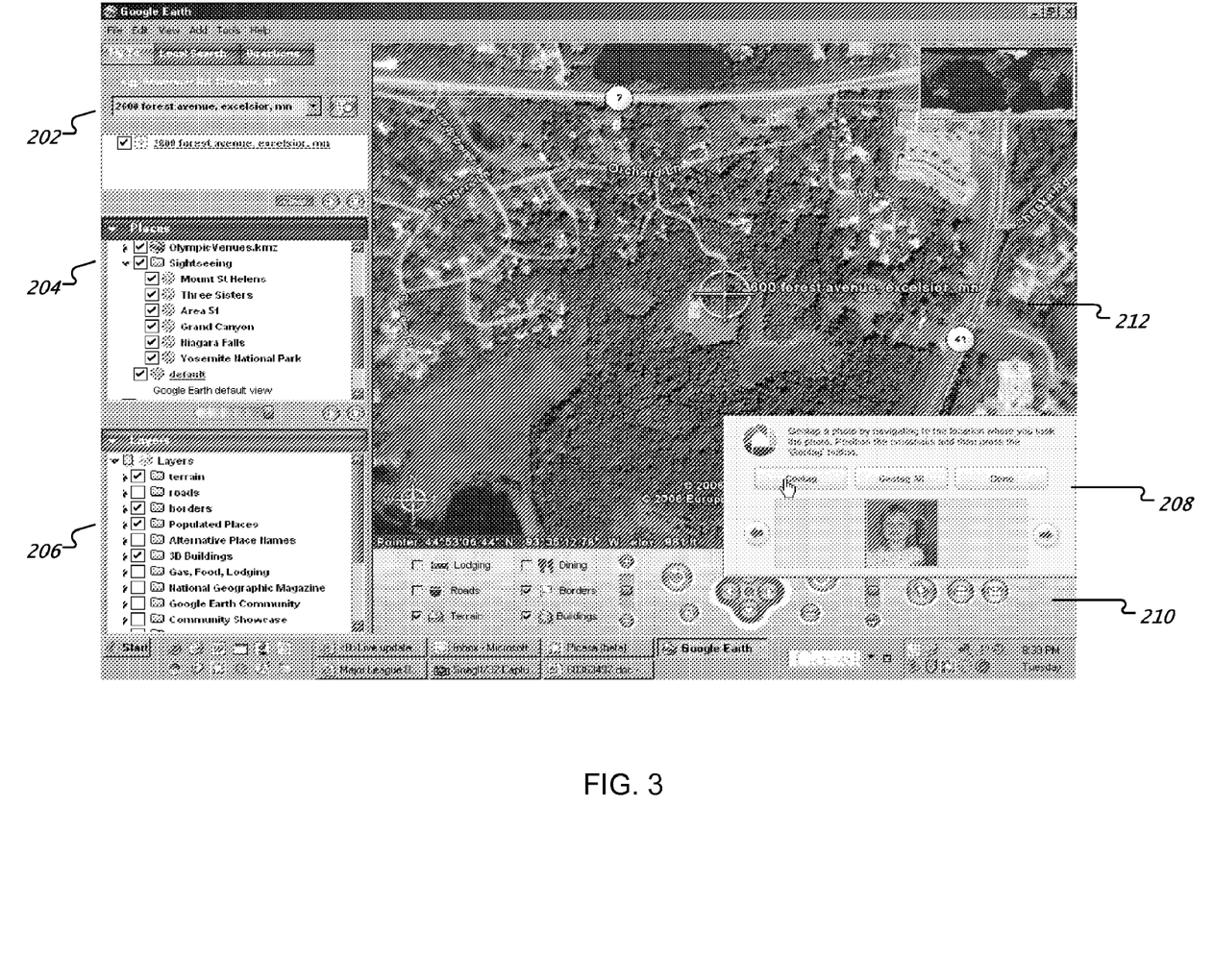
FIG. 3 is a screen shot of a geo-application interoperating with a photo tool.

Selection of the "Geotag with Google Earth" choice may start a process that is shown in FIGS. 2 and 3. FIG. 2 is a screen shot of a geo-application interoperating with a photo tool. FIG. 3 is a screen shot of a geo-application interoperating with a photo tool. In general, FIG. 2 may show such operation before a location is associated with a object or objects such as a photo or photos, while FIG. 3 may show such operation after a correlated location has been identified by a user.

Initially, the process may cause a geographic information system application, such as Google Earth, to be launched, or to be made active if it is already running. In addition, a "topmost" window may be opened, such as in the Windows operating system or another operating system. The topmost window may be unknown to the Google Earth client, but may access information about the geographic information system, such as the current location on which the system is focused, by accessing through a provided API, using COM or another component model for the system. Such a window 208 is shown in FIG. 2.

Instructions may be provided to a user in the topmost window 208, such as instructions to a user to navigate in the geographic information system to identify a location for the object, such as an digital photo. A selection button labeled "Geotag" may be selected by the user when they have identified a location, and the image application or topmost window 208 application may access location information, such as latitude/longitude coordinates, from the geographic information system and associate them with the object. The location information may be stored in a database associated with the image application, and may be associated there with the particular object or objects.

A selection of a "Geotag All" button may cause all previously-selected photos from the image application or all images in a particular folder or other group, to be correlated with a common identified geographic location from the geographic information system. Such photos may be the various photos displayed in and referenced by window 208. Selection of a "Done" button may cause the topmost window 208 to close, and the user to be returned to the geographic information system application or the image application.

The geographic image system application may include an number of relevant areas or panes. For example, a search box 202 may receive an address query from a user, and may resolve the address to a geographic location, such as a lat/long pair, and may cause the focus of a geographic view 212 of the application to change to that location (e.g., to zoom in from a world view to a close-up view). A places pane 204 may show particular locations by name, such as famous locations or locations that a particular user has previously identified for the system. A user may then simply select one of those locations to have the application focus the geographic view 212 on that selected location. A layers pane 206 shows various categories of metadata associated with a geography, such as street names, borders, and points of interest, and various of the layers may be selected by a user for display. Selection of more layers adds useful information to the display, but at the same time may clutter the display.

A control area 210 provides a number of navigation controls for moving around in the area. For example, particular layers may be turned on and off using check boxes. Also, pan and tilt of a 3D world view may be adjusted, as may rotation and zoom level, in familiar manners.

FIG. 3 shows the system after a user has typed into the geographic information system application the address "2600 Forest Avenue, Excelsior Minn. 55331." Acting independently, the geographic information system has zoomed in on that address and has displayed the area around the address. When a user selects a "Geotag" choice or similar choice in the topmost window 208, the topmost window 208 application or a related application may access the geographic location information, and may store or combine that information to provide geo-correlation for the image. Accessing of the information may occur by a variety of known manners, such as via an API associated with the geographic information service or application.

At appropriate points in the process, certain information may be associated with the photos. For example, geographic information such as coordinates may be written into fields in the file format for the photo, such as EXIF header fields for a JPEG image. In this manner, the geo-correlation information may follow the image even if it is sent (e.g., via disk or e-mail) to another location, and is thus no longer correlated with a particular instance of an image application or geographic information system. In addition, data files associated with the geographic information system may also be created and/or updated, such as files in the form of the known KML and KMZ files used with the Google Earth application.

The image application and the geographic information system application may be located on a client, on a server, or on both a client and a server, with appropriate functionality provided by each component. Likewise, the application generating the window 208 may be on a client or server. The applications may communicate using a standard web-based application programming interface (API), and may thus be located on different computers or servers, and on different or the same domains. Alternatively, the applications may be on a common server, even where web-based API communication is used.

Figure 4:
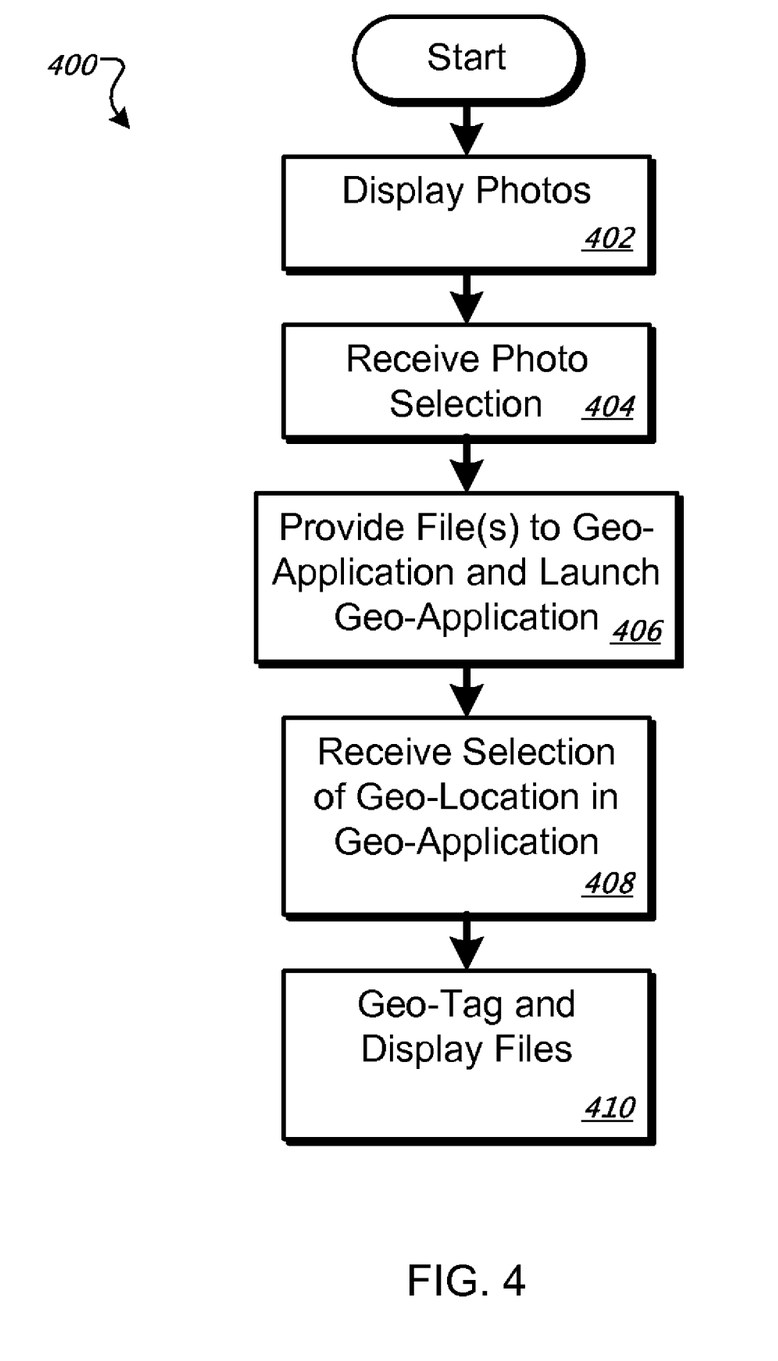
FIG. 4 is a flow diagram showing actions for geo-correlating one or more photos.

FIG. 4 is a flow diagram showing actions for geo-correlating one or more photos. In general, a user identifies photos in an image application such as Picasa, selects to have the images geocoded, and then identifies a location for the photos in a geographic information system application, such as Google Earth. In certain implementations, an application such as that generating window 208 may communicate with both the image a geographic applications to make communications flow more smoothly and to minimize the number of changes, if any, that may need to be made to either application.

At box 402, an image application displays photos to a user. The user then selects one or more photos at box 404. The user may then select a control to identify a desire to have the photos geo-correlated, such as by clicking on an icon or menu selection related to such actions. Such a selection may cause the image application to transmit data in a certain manner such as in an XML or KML mark-up file, to another application. The data may include one or more identifiers for the selected photos, along with any geo-correlating information that may already be associated with the selected files (e.g., in their EXIF data). Such selection may also cause the imaging application to trigger the launch or activation of a geographic information system application, and/or a helper application associated with the geographic imaging application (act 406).

Using such applications, a user may then select a geo-location for the one or more selected images. One location may be selected from a group of images, or locations may be selected one-by-one. The selection may happen graphically or by a combination of entering an address or other information and then navigating graphically. The navigational interface for Google Earth provides an example of such navigational possibilities.

When a location for the photo(s) has been identified, the user may select a control to geo-tag the photos with the selected location. The geographic information system application or the helper application may access the image using the information provided by the image application, and may access the location data (e.g., lat/long coordinates) from the geographic information system application, and may update meta data associated with the image(s) (e.g., EXIF data) to reflect the particular location selected b the user (box 410). Subsequent accessing of the files may take advantage of the geo-correlating information, such as by providing a map each time a geo-correlated pictures is displayed.

Figure 5:
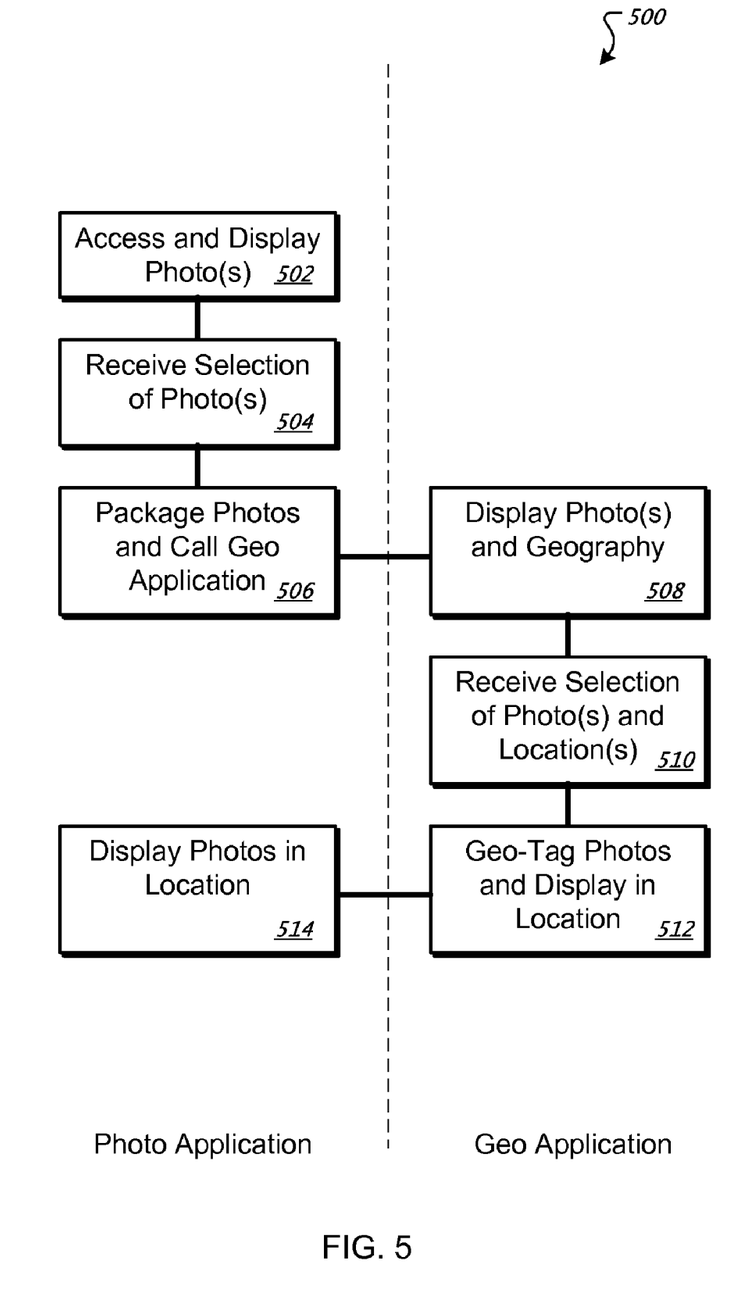
FIG. 5 is a swim lane diagram showing actions for geo-correlating one or more photos.

FIG. 5 is a swim lane diagram showing actions for geo-correlating one or more photos. For illustrative purposes, the actions are shown as occurring in a photo application and a geo application. In various implementations, the applications may be based in whole or in part on clients and/or servers. In addition, certain actions may take place on multiple machines, such as certain actions occurring on an application on a client device, which communicates with other applications (e.g., photo applications) on a client device and with geographic information system applications on a remote server.

At box 502, the photo application is opened and accesses and displays photos for a user in a conventional manner. At box 504, the user selects one or more of the displayed photos. At box 506, the user executes a command to indicate that he or she would like to geo-correlate the selected photos. This selection causes the photo application to package the photos, such as by generating a mark-up file providing an identifier for each of the selected photos (e.g., a URI or path and file name). The photo application may then cause the geo application to be launched so that locations for the photos may be identified by the user (box 506).

When launched, the geo application or applications may display both a geography, such as a map or a 3D representation of the earth or another planet (or the moon). Such display may permit a user to identify a particular photo or photos to locate, and then to navigate to a particular location. When both such actions have occurred (box 510), the user may select a control to cause the selected photo(s) to be geo-correlated with the selected location(s). Such geo-correlation generally occurs by updating meta data in a header of an image file or in a file associated with an image filed (box 512). The editing may occur via the geo application (including a helper application that communicates with a stock geographic information service application) or by another application such as the photo application.

Figure 6:
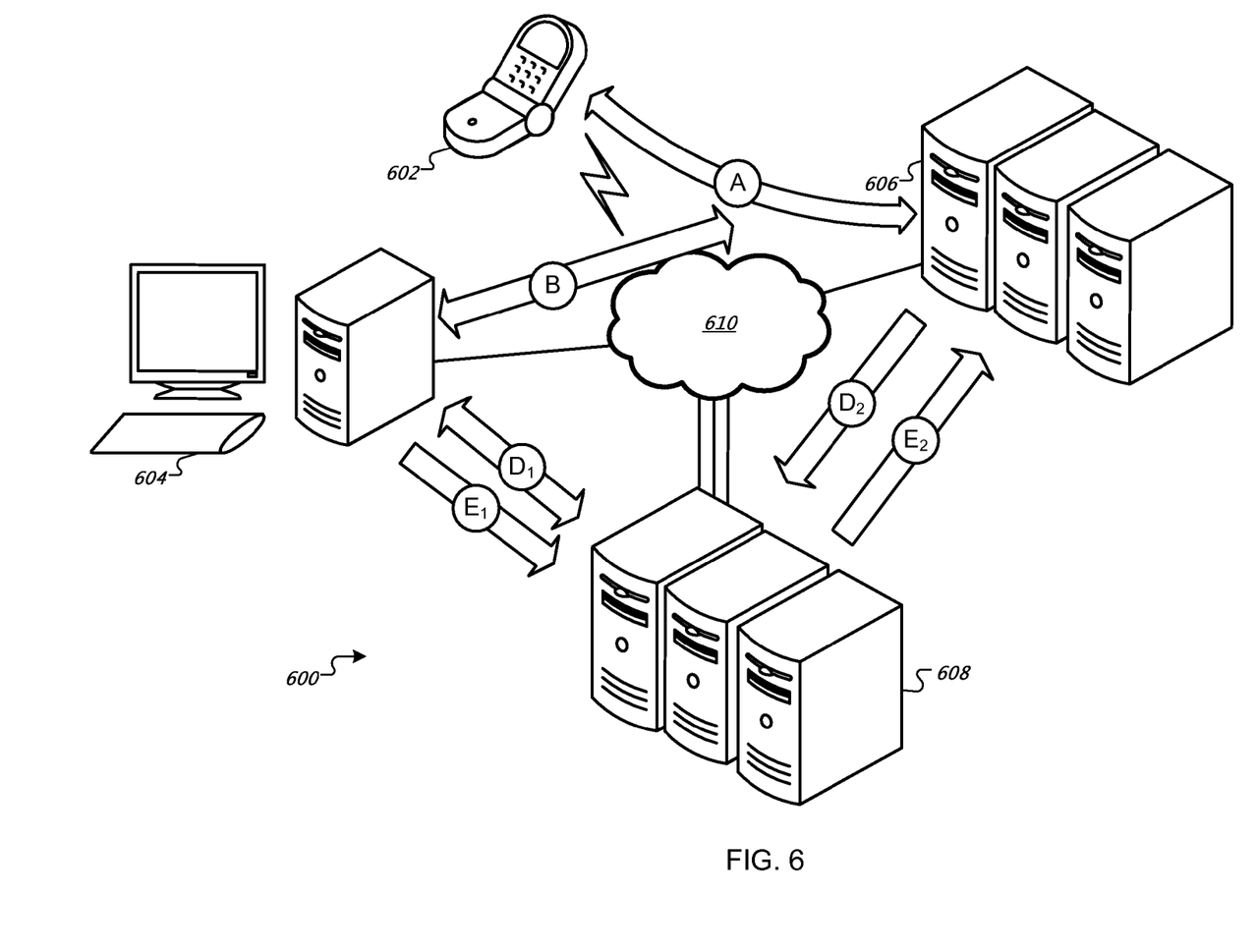
FIG. 6 is a schematic diagram showing a system and process for geo-correlating photos and other objects.

FIG. 6 is a schematic diagram showing a system 600 and process for geo-correlating photos and other objects. In general, the system includes client devices and servers for creating pictures, editing the pictures, organizing the pictures, and geo-correlating the pictures. The various devices may communicate over a network 610 such as the internet.

Mobile device 602 represents a smartphone, PDA, digital camera, or other similar device that has image capture capability. In this example, the device 602 is capable of directly uploading photos wirelessly to a user account or to another location. A computer 604 represents a desktop personal computer that the user may have at home, and that the user employs to manage a large photo collection.

Photo servers 606 represent servers (e.g., including web servers) that may store digital images for a user, either for short-term or long-term time frames. For example, the photo servers 606 may receive photos taken by the mobile device 602 and may hold them until the user downloads them to his or her computer 604. Alternatively, the servers 606 may hold the photos for a longer period of time, and the user may access the photos on-line using the servers 606.

Geo servers 608 may provide a graphical geographical information service, such as Google Earth. The service may permit search and graphical navigation of geographical space, such as in the manners discussed above. The servers 608 may communicate geographical information, such as lat/long data for selected locations, to other components in the system 600.

Lettered arrows show an example of a flow of information in the system 600. Arrow A shows mobile device 602 capturing a photo and communicating with photo servers 606 to upload the photo for later access. The mobile device 602 may be used to apply certain metadata to the photo. For example, if the device has a GPS capability, it may automatically geo-code the photo. Likewise, a user of the device may select one or more tags to associate with the photo (e.g., "European Vacation," "Packers game," etc.)

As shown by Arrow B, the user may later return to his or her home and may begin managing his or her photo collection. For example, the user may have returned from a long vacation during which he or she took numerous pictures. The user may log onto the photo servers 606 to access his or her photo collection (which may then be downloaded to the user's computer 604, or may have previously been loaded onto the computer 604). The user may select certain photos for geo-tagging (such as all photos having a common tag), and arrow D1 shows the redirection of the user's computer 604 to geo servers 608.

Such redirection may occur by the launching of a geo application on the computer 604, such as in a web page accessed by the computer 604. Via Arrow D1, information about the selected photos is provided to the geo application (or an application associated with the geo application), and the user may operate the system 600 to identify a location for associating with the photos. In certain implementations, information about the photos may also be passed from photo servers 606 to geo servers 608 (as shown by Arrow D2), either directly or via computer 604.

Arrow E1 represents a command from the user to geo-tag a photo or photos. The command may cause the geo servers 608 to release information, such as lat/long data, for the location that was selected by the user. Such data may be passed by the geo servers 608 to the computer 604 or to photo servers 606 (Arrow E2), and may then be added to the relevant selected photos. Subsequent accessing of the photos may then take advantage of the geo-tagged information.

Figure 7:
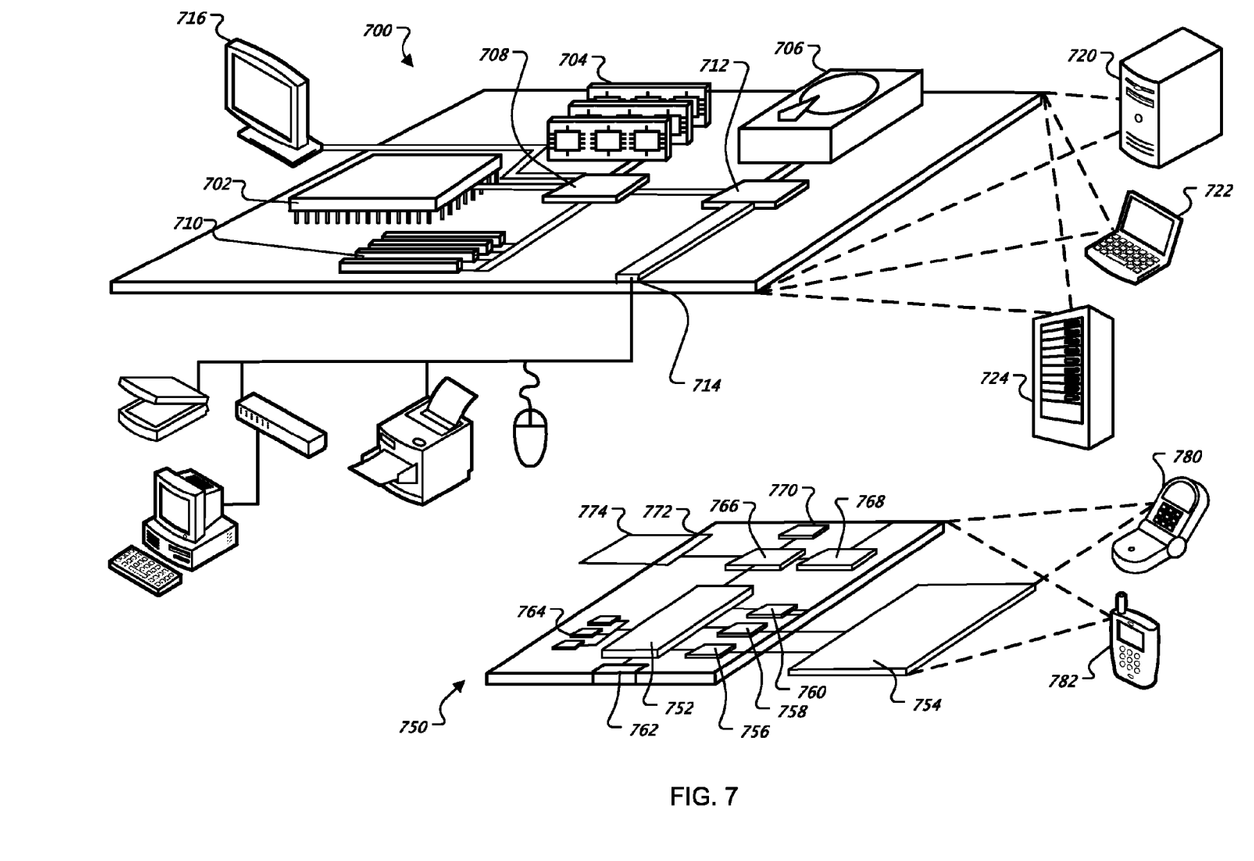
FIG. 7 is a block diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of what has been described. For example, various forms of the flows shown above may be used, with steps re-ordered, added, or removed. Also, although several applications of photo geo-correlation systems and methods have been described, it should be recognized that numerous other applications are contemplated. Accordingly, other embodiments are within the scope of the following claims.

What is claimed is:

1. A computer-implemented method for correlating an electronic object with a geo-location, comprising:
   receiving, from a first application, information identifying an object and at least one textual tag for the object;
   generating, based on the at least one textual tag, a geo-correlation location for the object, with the geo-correlation location comprising information indicative of an estimated geo-location for the object;
   automatically causing a second application to display the geo-correlation location; and
   updating the geo-correlation location by:
      receiving a user-defined tag, with the user-defined tag comprising geo-location information for the object, and with a level of specificity associated with the user-defined tag being greater than a level of specificity associated with the geo-correlation location.

2. The method of claim 1, wherein the object comprises an image file.

3. The method of claim 2, wherein the image file comprises a JPEG file.

4. The method of claim 2, further comprising: writing geo-location data to fields in the image file.

5. The method of claim 1, wherein the user-defined tag is generated at least partly based on a user interaction with the second application, and wherein the user interaction comprises graphically zooming and panning in a visual representation of the Earth.

6. The method of claim 1, wherein the user-defined tag comprises longitude/latitude data.

7. The method of claim 1, further comprising:
   generating a map that comprises information indicative of the geo-correlation location,
   wherein receiving the user-defined tag comprises:
      receiving a selection of an area of the map, with the selected area of the map in accordance with the geo-location of the object.

8. The method of claim 1, wherein receiving the user-defined tag comprises:
   passing latitude/longitude information from the second application to another application.

9. A computer-implemented system, comprising:
   a module configured to:
      receive, from a first application, information identifying an object and at least one textual tag for the object;
      generate, based on the at least one textual tag, a geo-correlation location for the object, with the geo-correlation location comprising information indicative of an estimated geo-location for the object;
      automatically cause a second application to display the geo-correlation location; and
   means for updating the geo-correlation location by: receiving a user-defined tag, with the user-defined tag comprising geo-location information for the object, and with a level of specificity associated with the user-defined tag being greater than a level of specificity associated with the geo-correlation location.

10. The system of claim 9, wherein the user-defined tag is generated at least partly based on a user interaction with the second application, wherein the user interaction comprises graphically zooming and panning in a visual representation of the Earth.

11. The system of claim 9, wherein the geo-location information comprises latitude/longitude information.

12. The system of claim 9, wherein the object comprises an image file.

13. The system of claim 12, wherein the functions further comprise:
   writing geo-location data to fields in the image file.

14. The system of claim 9, wherein the user-defined tag is generated at least partly based on a user interaction with the second application, and wherein the user interaction comprises graphically zooming and panning in a visual representation of the Earth.

15. A computer-implemented system, comprising:
   one or more processing devices; and
   one or more non-transitory machine-readable media configured to store instructions that are executable by the one or more processing devices to perform functions comprising:
      receiving, from a first application, information identifying an object and at least one textual tag for the object;
      generating, based on the at least one textual tag, a geo-correlation location for the object, with the geo-correlation location comprising information indicative of an estimated geo-location for the object;
      automatically causing a second application to display the geo-correlation location; and
      updating the geo-correlation location by:
         receiving a user-defined tag, with the user-defined tag comprising geo-location information for the object, and with a level of specificity associated with the user-defined tag being greater than a level of specificity associated with the geo-correlation location.

16. One or more non-transitory machine-readable media configured to store instructions that are executable by one or more processing devices to perform functions comprising:
   receiving, from a first application, information identifying an object and at least one textual tag for the object;
   generating, based on the at least one textual tag, a geo-correlation location for the object, with the geo-correlation location comprising information indicative of an estimated geo-location for the object;
   automatically causing a second application to display the geo-correlation location; and
   updating the geo-correlation location by:
      receiving a user-defined tag, with the user-defined tag comprising geo-location information for the object, and with a level of specificity associated with the user-defined tag being greater than a level of specificity associated with the geo-correlation location.

17. The one or more machine-readable media of claim 16, wherein the object comprises an image file.

18. The one or more machine-readable media of claim 17, wherein the functions further comprise: writing geo-location data to fields in the image file.

19. The one or more machine-readable media of claim 16, wherein the user-defined tag is generated at least partly based on a user interaction with the second application, and wherein the user interaction comprises graphically zooming and panning in a visual representation of the Earth.

20. The one or more machine-readable media of claim 16, wherein receiving the user-defined tag comprises:
   passing latitude/longitude information from the second application to another application.

* * * * *

UNITED STATES PATENT AND TRADEMARK OFFICE
CERTIFICATE OF CORRECTION

| | | |
|---|---|---|
| PATENT NO. | : 7,978,207 B1 | Page 1 of 1 |
| APPLICATION NO. | : 11/762670 | |
| DATED | : July 12, 2011 | |
| INVENTOR(S) | : Herf et al. | |

It is certified that error appears in the above-identified patent and that said Letters Patent is hereby corrected as shown below:

On the Title page, column 2 (Other Publications), line 8, please delete "Butterfiel," and insert --Butterfield,--, therefor.

Signed and Sealed this
Fourth Day of October, 2011

David J. Kappos
*Director of the United States Patent and Trademark Office*